Sept. 9, 1930.  H. F. TOWNER  1,775,297
HITCH
Filed Dec. 27, 1927

Inventor
Heber Fred Towner
By Lyon & Lyon
Attorneys

Patented Sept. 9, 1930

1,775,297

UNITED STATES PATENT OFFICE

HEBER FRED TOWNER, OF SANTA ANA, CALIFORNIA; P. G. BEISSEL, EXECUTOR OF SAID HEBER FRED TOWNER, DECEASED, ASSIGNOR TO B. V. CURRY, TRUSTEE

HITCH

Application filed December 27, 1927. Serial No. 242,599.

This invention relates to a hitch and is more particularly related to a hitch adapted for use as a connecting means between a ground working implement or the like and a draft implement, the hitch being operable to connect the ground working implement with the draft implement without necessitating the tipping of the frame of the draft implement to locate the hitch thereof at a level with or in position to be connected with the draft implement.

In the operation of ground working implements particularly implements including a power lift mechanism by which the frame is elevated and lowered from and to the ground working position, it is extremely difficult to connect the hitch of such an implement with the draft pole of the power implement or tractor and in cases of heavy power lift implements, it has been necessary to resort to the use of jacks or the like in order to raise the rear end of the frame to lower the forward end of the frame to a position where the draft connection could be made. In other or lighter forms of power lift implements, it has been common practice for the operator to stand on the forward end of the frame or to get another individual with himself to stand on the forward end of the frame to lower the frame to the position where the draft connection could be made. Serious accidents have resulted from these endeavors to connect the power lift implement with the tractor or draft implement due to slipping of the individual standing on the frame or the jacks or the like in order to force the lower end of the frame of the power lift implement to a point where the draft connection could be made.

It is, therefore, an object of this invention to provide a hitch adapted for use particularly in connection with power lift implements by means of which a draft connection may be made to the tractor or other draft implement with the frame of the power lift implement in any position which the same may assume and which may then be actuated to connect the tractor with the frame of the power lift implement in position to hold the frame of the power lift implement in parallel position in relation to the ground being worked and in relation to the draft connection of the tractor or other draft implement.

Another object of this invention is to provide an adjustable draft hitch which may be employed for maintaining the frame of a power lift implement in horizontal position and may be used to regulate the depth to which the ground working tools of the power lift implement will penetrate the ground with the frame of the power lift implement maintained in horizontal position.

Other objects and advantages of this invention, it is believed, will be apparent from the following detailed description of a preferred embodiment of the same, as illustrated in the accompanying drawings.

In the drawings:

Figure 1 is a side elevation of a power lift implement illustrating the same as connected through a hitch embodying this invention with a fragment of a tractor or other draft implement and illustrating in dotted lines the position assumed by such power lift implements when not connected with the tractor and not having their frames lowered on the power lift to the ground working position and showing the hitch in dotted lines as connecting the frame of the power lift implement with the draft connection of the tractor.

Figure 1:
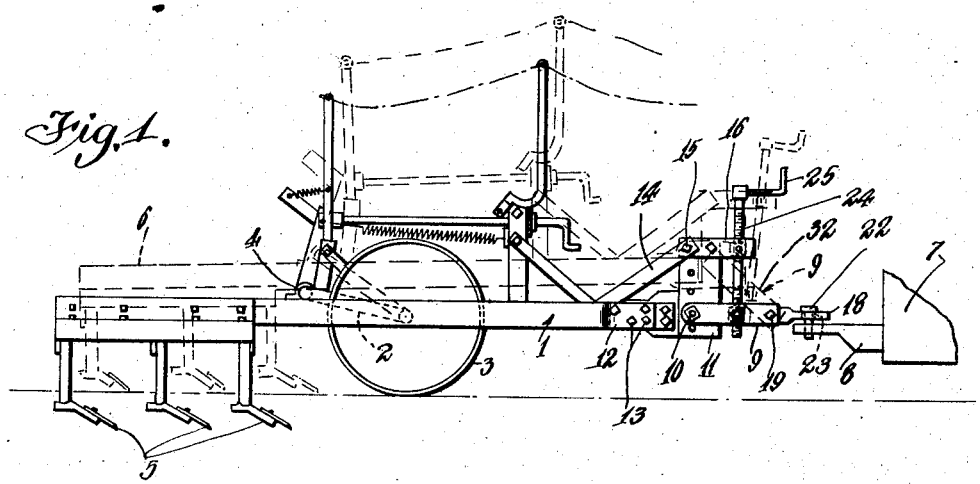
Figures 2, 3, 4:
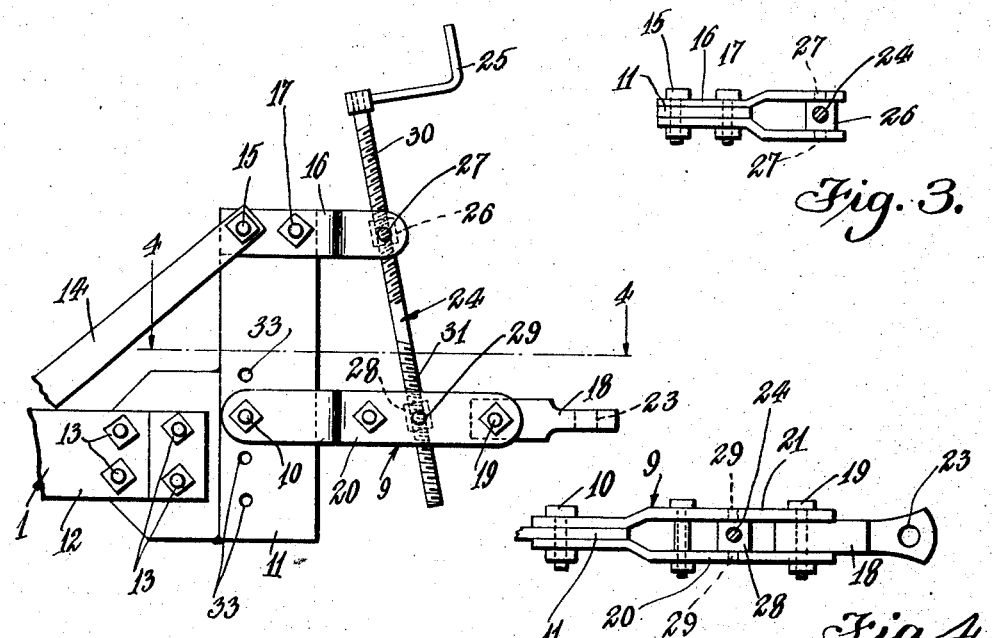
Figure 2 is a side elevation of a hitch embodying this invention illustrating the same as secured to the forward end of the frame of a power lift implement.
Figure 3 is a plan view of the upper hitch bracket embodied in this invention.
Figure 4 is a plan view of the swivel link embodied in this invention, the view being taken substantially on the line 4—4 of Figure 2.

In the preferred embodiment of this invention illustrated in the accompanying drawings, 1 indicates the frame of a power lift implement which is mounted upon a crank axle 2 on the transverse arms of which ground wheels 3 are journaled. The crank axle 2 is journaled in bearings 4 transversely of the frame 1. Any suitable or desirable form of power lift mechanism, such as is well understood in the art may be employed for rocking the frame 1 of the crank axle 2 to raise and lower the ground working tools 5 to and from the ground working position. One form of such power lift implement is illustrated in my copending application filed September 29, 1926, Serial No. 138,532, for power lift implement. In such a form of implement, the frame 1 assumes an inclined position when the frame has been raised on the crank axle 2 to raise the tools 5 from the working position, as is illustrated in dotted lines indicated at 6. In such position, it is difficult to secure the frame 1 to the draft implement or tractor 7 and then obtain a straight line draft from the tractor 7 through the frame 1 without permitting the frame 1 to move out of a horizontal position when the power lift implement is being used to cultivate the soil.

In order to enable the frame 1 to be connected with the draft bar 8 of the tractor 7 and to enable the frame 1 to be maintained in horizontal position when the tools 5 are lowered to the ground working position, I provide a swivel link 9 which is pivotally secured at a pin 10 to an upright plate 11. The plate 11 is secured to the forward end 12 of the frame 1 by any suitable means, such as is indicated at 13. The plate 11 is braced by means of a brace bar 14 which is secured at a bolt 15 to the upper end of the plate 11 at one end and at its opposite end to the frame 1. Secured to the upper end of the plate 11 is an upper hitch bracket 16 which is secured to the plate 11 by means of the bolts 15 and 17. The link 9 carries a hitch bar 18 at its forward end on a pin 19. The bar 18 is free to pivot between the opposed members 20 and 21 of the link 9. The bolt 22 is passed through a hole 23 formed in the bar 18 and through a hole formed in the draft bar 8 of the tractor 7. The position of the link 9 is adjusted by means of a screw 24 having a crank handle 25 secured at its upper end. The screw 24 is screw-threaded within a nut 26, which nut 26 is pivotally mounted within the bracket 16 as indicated at 27. The screw 24 is also screw-threaded through a nut 28 which is pivotally mounted between the members 20 and 21 of the link 9, as indicated at 29. The threads 30 and 31 of the screw 24 are one right handed and the other left handed, so that a mechanism equivalent to a jack is interposed between the link 9 and bracket 16.

The operation of the hitch embodying this invention is as follows:

With the frame 1 elevated to the position indicated at 6, the link 9 is adjusted by rotating the crank handle 25 of the screw 24 to adjust the link 9 to the position indicated at 32. The screw 24 is then rotated to adjust the frame 1 to a position where the frame 1 will be horizontal when the tools 5 are lowered to the ground working position and there is a straight line connection between the draft bar 8 and the frame 1. In order to permit the frame 1 to be adjusted to different horizontal elevations while still maintaining this straight line draft connection between the draft bar 8 and frame 1, a multiplicity of holes 33 are formed in the plate 11 into any one of which the pin 10 may be inserted to secure the link 9 to the plate 11.

Having fully described my invention, it is to be understood that I do not wish to be limited to the details herein set forth, but my invention is of the full scope of the appended claims.

I claim:

1. In a device of the class described, the combination of a plate, a pivot link, means for pivotally securing the pivot link to the plate, a bracket secured to the plate at a point spaced from the pivot link, a jack interposed between the bracket and pivot link, and means for adjusting the position at which the pivot link is pivoted to said plate.

2. In a device of the class described, the combination of a pivot link, means for pivotally supporting the pivot link, a hitch bar pivotally secured to the link, a bracket, means for supporting the bracket, a screw, a nut pivotally mounted in the bracket and through which the screw is screw-threaded, and means for pivotally securing the screw to said link.

3. The combination with a power lift implement and a tractor, of a hitch for coupling the lift implement, and the tractor including a standard secured to the forward end of the lift implement, a link pivoted at its rear end to the standard, means for securing the link to the tractor, a screw jack secured to the standard and to the link for regulating the vertical position of the link in relation to the tractor to permit the coupling of the link with the tractor.

4. The combination with an implement and a tractor, of a hitch for coupling the implement and the tractor including a standard secured to the forward end of the implement, a link pivoted at its rear end to the standard, a screw having right and left-handed threads at its opposed ends, a nut pivotally supported by the standard, into which the screw is adapted to be threaded at one end, a nut pivotally supported by the link, into which the screw is adapted to be threaded at its opposite end, and means secured to the link for pivotally connecting the link with the tractor.

Signed at Santa Ana, California, this 17 day of Dec., 1927.

HEBER FRED TOWNER.